(12) United States Patent
Li

(10) Patent No.: US 9,007,033 B2
(45) Date of Patent: Apr. 14, 2015

(54) BATTERY TEMPERATURE DETECTION AND PARASITIC RESISTANCE COMPENSATION SYSTEM

(75) Inventor: Guoxing Li, Sunnyvale, CA (US)

(73) Assignee: O2Micro, Inc., Santa Clara, CA (US)

( * ) Notice: Subject to any disclaimer, the term of this patent is extended or adjusted under 35 U.S.C. 154(b) by 898 days.

(21) Appl. No.: 13/215,567

(22) Filed: Aug. 23, 2011

(65) Prior Publication Data
US 2013/0049678 A1 Feb. 28, 2013

(51) Int. Cl.
H02J 7/04 (2006.01)
H02J 7/00 (2006.01)

(52) U.S. Cl.
CPC ............... H02J 7/047 (2013.01); H02J 7/008 (2013.01); *H02J 7/0008* (2013.01)

(58) Field of Classification Search
USPC .......................................... 320/134, 150, 153
See application file for complete search history.

(56) References Cited

U.S. PATENT DOCUMENTS

| | | | |
|---|---|---|---|
| 6,360,720 B1 * | 3/2002 | Kesler | 123/406.55 |
| 6,958,590 B1 | 10/2005 | Vaananen | |
| 7,064,523 B2 * | 6/2006 | Aradachi et al. | 320/150 |
| 7,683,579 B2 | 3/2010 | Kim et al. | |
| 8,376,611 B2 | 2/2013 | Li et al. | |
| 2005/0017691 A1 | 1/2005 | Aradachi et al. | |
| 2008/0224667 A1 * | 9/2008 | Tanaka et al. | 320/137 |
| 2011/0175575 A1 | 7/2011 | Wu et al. | |
| 2012/0119716 A1 | 5/2012 | Chen et al. | |

FOREIGN PATENT DOCUMENTS

| | | |
|---|---|---|
| CN | 101865733 A | 10/2010 |
| CN | 102033561 A | 4/2011 |
| JP | 10-70846 A | 3/1998 |
| JP | 2001-245436 A | 9/2001 |
| TW | I333288 B | 11/2010 |
| TW | 201126863 A | 8/2011 |

\* cited by examiner

*Primary Examiner* — Drew A Dunn
*Assistant Examiner* — Robert Grant
(74) *Attorney, Agent, or Firm* — Pillsbury Winthrop Shaw Pittman LLP

(57) ABSTRACT

The present application provides systems and methods for battery temperature detection and parasitic resistance compensation. Compensation circuitry is provided to generate a compensation current, proportional to a battery charging or discharging current, to compensate for the parasitic resistance associated with the line connection between a charger/monitor and a battery pack. The compensation current operates to adjust a reference current supplied to a temperature sensor, to enable accurate temperature measurement of the battery pack while reducing or eliminating influence from the parasitic resistance. The compensation circuitry can be utilized in a battery charger topology to enhance battery charging control and/or a battery monitoring topology to enhance battery discharge control.

18 Claims, 4 Drawing Sheets

US 9,007,033 B2

BATTERY TEMPERATURE DETECTION AND PARASITIC RESISTANCE COMPENSATION SYSTEM

BACKGROUND

FIG. 1 depicts a conventional single-ended battery charging system 100. The charging system 100 generally includes a charger 102 and a battery pack 104, as is well known. The charger 102 may include a source 106 and a charger controller 108 to control the charging current from the source 106 to the battery 104. In the conventional charger architecture, for safety reasons, the controller 108 is typically configured to sense the battery temperature so that the controller can adjust the charging current based on the detected temperature, or perform Over-Temperature (OT) protection to stop charging the battery if the temperature exceeds a threshold. To that end, the battery pack 104 includes a thermistor, $R_{TS}$, and the resistance of the thermistor varies with temperature. For a conventional negative temperature coefficient (NTC) or positive temperature coefficient (PTC) type thermistor, the resistance of $R_{TS}$ will change linearly as the temperature changes. The controller 108 may include a voltage sensing node $V_{TS}$ coupled to $R_{TS}$ to sense the change in voltage across $R_{TS}$ as a function of battery temperature. More particularly, the controller 108 may include a voltage divider circuit defined by $R_{PU}$ (a pull-up resistor) and $R_{TS}$. A reference voltage, $V_{REF}$, of the controller 108 may be used to drive the voltage divider circuit. In the idealized scenario, since $V_{REF}$ and $R_{PU}$ are fixed, as $R_{TS}$ changes due to temperature changes in the battery pack 104, $V_{TS}$ will change proportionally. Thus, the controller 108 can detect battery pack temperature information and, if necessary, adjust the charging current accordingly.

However, the temperature detection accuracy will be affected by the parasitic resistance of the power trace, depicted as $R_{PAR}$. $R_{PAR}$ may result from, for example, the resistance of a PCB trace, power cord resistance, contact resistance from the connection between the battery pack 104 and the charger 102, or a combination of these. The voltage drop over $R_{PAR}$ will directly contribute to the sensing voltage over the thermistor $R_{TS}$, and thus an error is introduced into the control of charging current based on temperature. In operation, the charging current delivered to the battery 104 will control the voltage drop over $R_{PAR}$, which in turn will influence the detected voltage across $R_{TS}$. In other words, $V_{TS}=V_{RTS}+V_{RPAR}$, and so, for a given value of $R_{TS}$ (meaning the temperature is unchanged), as the charging current increases, $V_{RPAR}$ will increase and therefore $V_{TS}$ will increase, but not due to temperature changes in the battery pack. As a result of the influence of $R_{PAR}$ and assuming an NTC thermistor, the actual OT trigger point will need to be lower than the actual temperature of the battery, since $R_{TS}$ will drop lower to account for the parasitic resistance. This can introduce a significant safety concern about the operation of battery pack.

SUMMARY

In one embodiment, the present disclosure provides a battery charger system that includes charger controller circuitry and compensation circuitry. The charger controller circuitry is configured to generate a controllable charging current to charge a battery coupled to the charger controller circuitry, the charger controller circuitry includes a temperature sensing node configured to be coupled to temperature sensor circuitry, associated with the battery, to monitor a voltage drop proportional to the temperature of the battery; wherein when the battery charger circuitry is coupled to the battery, a parasitic resistance is generated. The compensation circuitry is coupled to the temperature sensing node and configured to generate a compensation current that sinks current from the temperature sensing node in an amount proportional to a voltage drop of the controllable charging current across the parasitic resistance.

In another embodiment, the present disclosure provides a battery charger system that includes charger controller circuitry, a sense resistor and compensation circuitry. The charger controller circuitry is configured to generate a controllable charging current to charge a battery coupled to the charger controller circuitry, the charger controller circuitry includes a temperature sensing node configured to be coupled to temperature sensor circuitry, associated with the battery, to monitor a voltage drop proportional to the temperature of the battery; wherein when the battery charger circuitry is coupled to the battery, a parasitic resistance is generated. The sense resistor is configured to generate a voltage drop proportional to the controllable charging current. The compensation circuitry includes an amplifier, a transistor and a resistor; wherein the amplifier having a first input coupled to a first side of the sense resistor and a second input coupled to an output of the transistor, the amplifier also having an output coupled to the transistor to control the conduction state of the transistor; and wherein the transistor and resistor are coupled in series between the temperature sensing node and a second side of the sense resistor; and wherein the output of the amplifier controls the resistance of the transistor so that the voltage at the first input substantially matches the voltage at the second input.

In another embodiment, the present disclosure provides a battery charger system that includes charger controller circuitry, a sense resistor and compensation circuitry. The charger controller circuitry is configured to generate a controllable charging current to charge a battery coupled to the charger controller, the charger controller includes a temperature sensing node configured to be coupled to temperature sensor circuitry, associated with the battery, to monitor a voltage drop proportional to the temperature of the battery; wherein when the battery charger circuitry is coupled to the battery, a parasitic resistance is generated; and wherein the charger controller circuitry further includes current source circuitry configured supply a temperature sensing current, based on a reference current, to the temperature sensor circuitry, wherein the value of the reference current is determined by the temperature sensing current and the compensation current. The sense resistor is configured to generate a voltage drop proportional to the controllable charging current. The compensation circuitry includes an amplifier, a transistor and a resistor; wherein the amplifier having a first input coupled to a first side of the sense resistor and a second input coupled to an output of the transistor, the amplifier also having an output coupled to the transistor to control the conduction state of the transistor; and wherein the transistor and resistor are coupled in series between the temperature sensing node and a second side of the sense resistor; and wherein the output of the amplifier controls the resistance of the transistor so that the voltage at the first input substantially matches the voltage at the second input. The current source circuitry includes amplifier circuitry having a first input configured to receive a reference voltage and a second input configured to receive a voltage proportional to the controllable charging current, a transistor configured to be controlled by an output of the amplifier, and a current mirror; wherein the transistor is coupled between the current mirror and the voltage proportional to the controllable charging current to generate the reference current; and wherein the output of the amplifier controls the resistance of the transistor so that the voltage at the first input substantially matches the voltage at the second input.

In another embodiment, the present disclosure provides a battery discharging system that includes monitoring circuitry and compensation circuitry. The monitoring circuitry is configured to control a discharge current from a battery, the monitoring circuitry comprising a temperature sensing node configured to be coupled to temperature sensor circuitry, associated with the battery, to monitor a voltage drop proportional to the temperature of the battery; the monitoring circuitry further includes current source circuitry configured supply a temperature sensing current, based on a reference current, to the temperature sensor circuitry; and wherein when the monitoring circuitry is coupled to the battery, a parasitic resistance is generated. The compensation circuitry is coupled to the current source monitoring circuitry and configured to generate a compensation current that sources current into the current source monitoring circuitry in an amount proportional to a voltage drop of the discharge current across the parasitic resistance.

BRIEF DESCRIPTION OF DRAWINGS

Features and advantages of the claimed subject matter will be apparent from the following detailed description of embodiments consistent therewith, which description should be considered with reference to the accompanying drawings, wherein:

DETAILED DESCRIPTION

The present application provides systems and methods for battery temperature detection and parasitic resistance compensation. Compensation circuitry is provided to generate a compensation current, proportional to a battery charging or discharging current, to compensate for the parasitic resistance associated with the line connection between a charger/monitor and a battery pack. The compensation current operates to adjust a reference current supplied to a temperature sensor, to enable accurate temperature measurement of the battery pack while reducing or eliminating influence from the parasitic resistance. The compensation circuitry can be utilized in a battery charger topology to enhance battery charging control and/or a battery monitoring topology to enhance battery discharge control.

Figure 1:
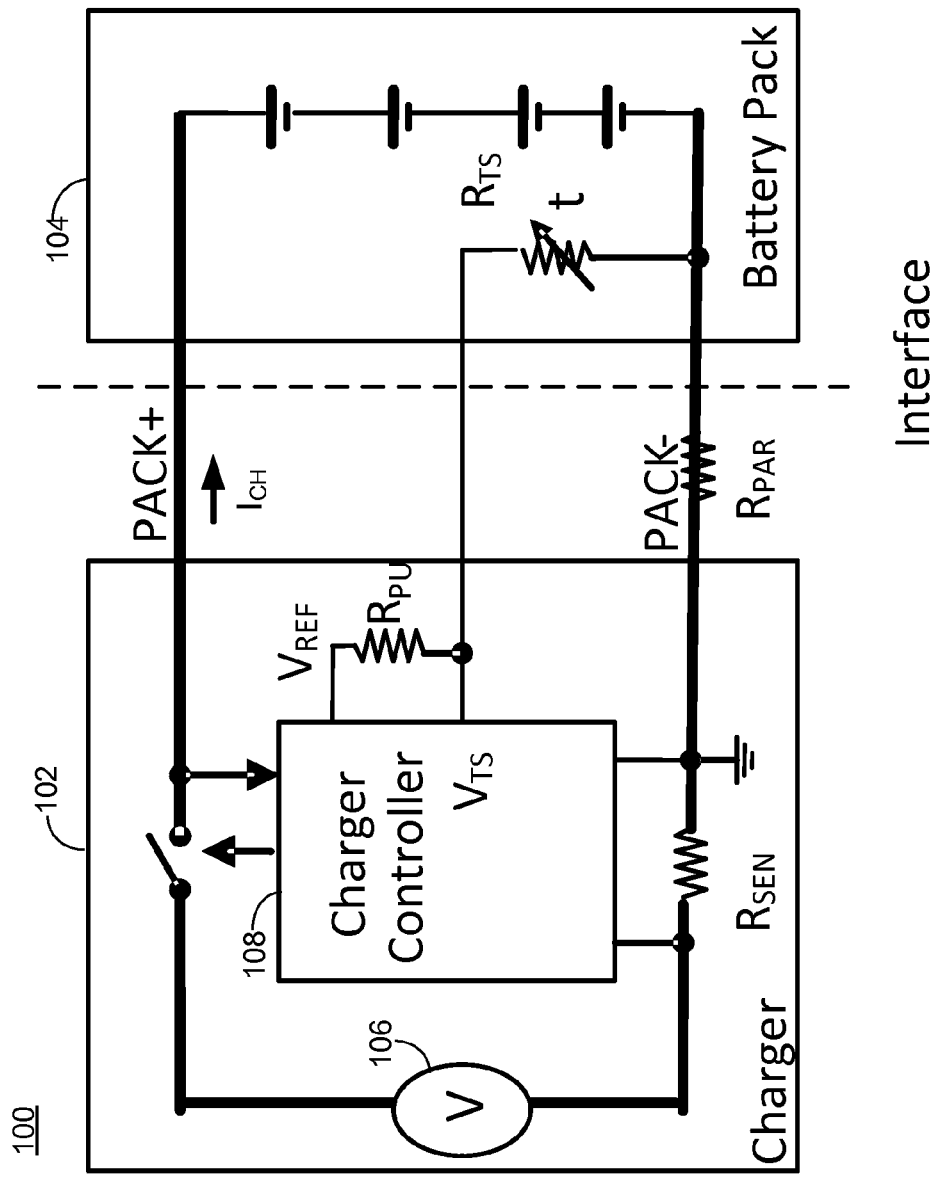
FIG. 1 depicts a block diagram of a conventional single-ended battery charging system.
Figure 2:
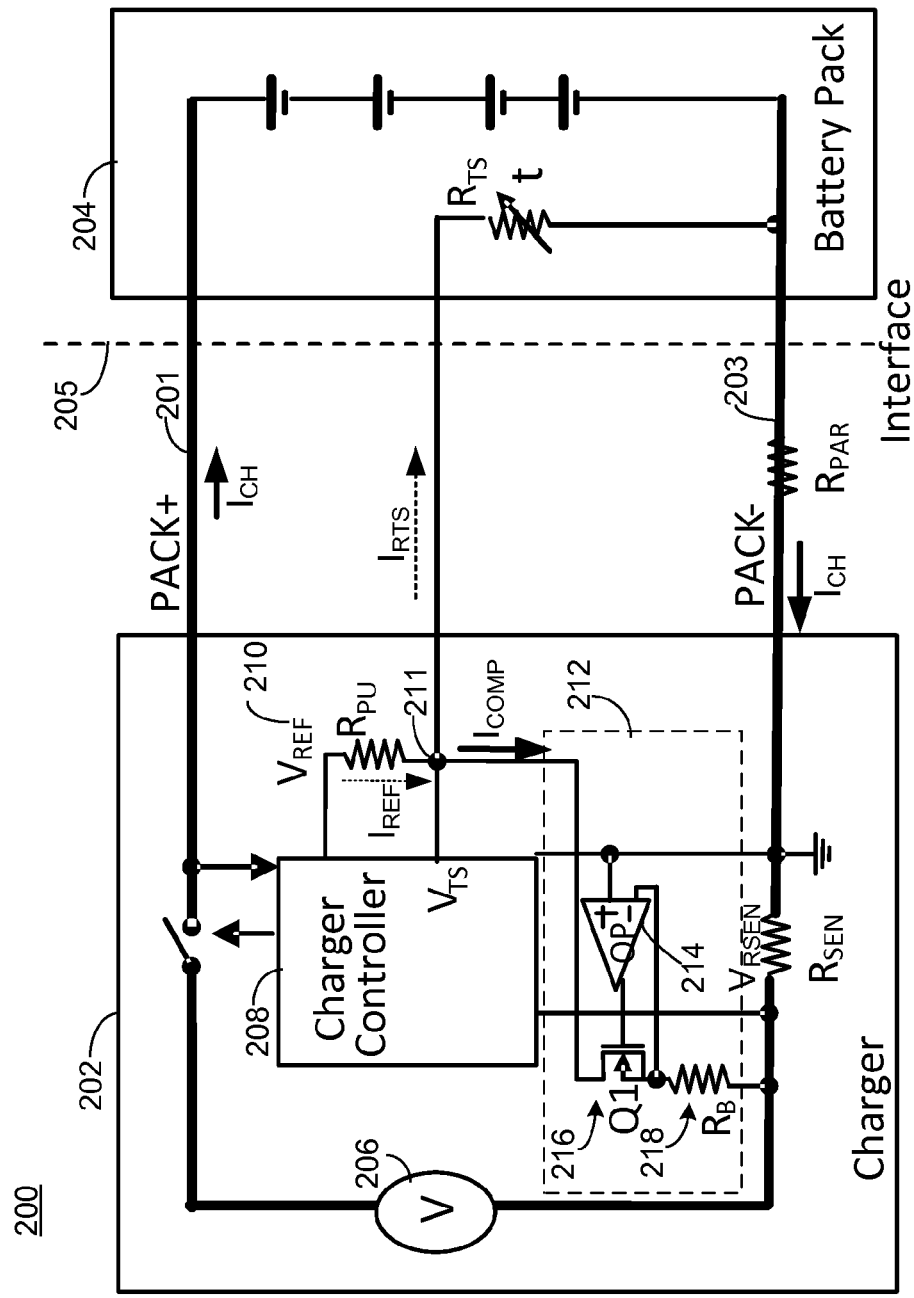
FIG. 2 depicts a block diagram of one exemplary power topology with battery temperature detection and parasitic resistance compensation capabilities, consistent with the present disclosure.

FIG. 2 depicts an exemplary battery charging system 200 consistent with one embodiment of the present disclosure. The charging system 200 of this embodiment may include a charger 202 and a battery pack 204. The topology depicted in FIG. 2 may be generally referred to as a single-ended control topology in that the charger 202 delivers charging current to the battery 204 via voltage rails 201 (PACK +) and 203 (PACK −). The charger 202 and battery pack 204 may be operably coupled together at interface 205, which may include, for example, PCB traces, wire traces, direct contact, etc. As is well understood in the art, battery pack 204 may include one or more battery cells, typically connected in series and configured to receive a charge and to supply power to a load (not shown). The battery pack 204 may also include temperature sensor circuitry (e.g., thermistor $R_{TS}$) disposed in proximity to one or more cells of the battery pack 204 to enable the thermister to be affected by the temperature of the battery pack 204. The temperature sensor circuitry may be coupled to the charger 202 to enable the charger 202 to obtain a battery temperature measurement. As is understood in the art, the thermistor ($R_{TS}$) changes resistance as the temperature of the battery pack 204 changes.

The charger 202 may include a source voltage 206 configured to supply a charging current to the battery, and, in some embodiments, may also be configured to supply power to a load (not shown in this Figure). The charger 202 may also include a charger controller 208 operably coupled to the source voltage 206 and the battery pack 204 and configured to control the charging current, $I_{CH}$, to the battery pack 204. Examples of charger controllers which may be utilized according to the teachings of this embodiment may include the OZ8980 and/or the OZ8981 manufactured by O2Micro International, Ltd. However, those skilled in the art will recognize that other charger controllers may be used according to the teachings herein, such as any charger controller that is configured to control charging current to batteries based on battery temperature feedback information. The charger 202 may also include a sense resistor $R_{SEN}$ which operates as a feedback resistor, and controller 208 may be configured to sense the voltage drop across $R_{SEN}$ to detect the battery charging current $I_{CH}$ supplied to the battery pack 204.

Charger 202 may also include temperature sensing circuitry, generally depicted be reference numeral 210, configured to detect the temperature of the battery pack 204. In this embodiment, temperature sensing circuitry 210 may include a pull-up resistor ($R_{PU}$) coupled between a reference voltage $V_{REF}$ generated by the charger controller 208 and a temperature sensing node 211 ($V_{TS}$) of the charger controller 208. A voltage divider circuit may be defined by a pull-up resister $R_{PU}$ and the thermistor $R_{TS}$ coupled to a reference voltage $V_{REF}$ generated by the controller 208. Thus, the temperature sensing node 211 ($V_{TS}$) of the charger controller 208 may receive voltage drop information across $R_{TS}$. In operation, and ignoring for a moment any parasitic resistance at interface 205, as the temperature in the battery pack 204 changes, the resistance of $R_{TS}$ will change, and thus the voltage drop across $R_{TS}$ and the sensed voltage $V_{TS}$ will change. Thus, charger controller 208 is enabled to receive temperature feedback information about the battery pack 204. To prevent an over temperature condition on the battery pack 204, controller 208 may be configured to compare the sensed voltage $V_{TS}$ (which corresponds to the temperature of the battery pack) to a programmable or preset over temperature (OT) threshold ($T_O$). If the temperature of the battery pack 204 exceeds the OT threshold, controller 208 may be configured to reduce or discontinue charging current to the battery pack 204 until the temperature drops below the OT threshold.

As noted above, in reality there exists a parasitic resistance $R_{PAR}$ from the coupling of the charger 202 and the battery pack 204. To compensate for the parasitic resistance $R_{PAR}$, the charger 202 of this embodiment may also include compensation circuitry 212. Generally, compensation circuitry 212 is configured to compensate for the influence that $R_{PAR}$ exerts on the temperature sensing node $V_{TS}$. With the influence of the parasitic resistance, the voltage at the $V_{TS}$ node is, in reality, a function of both the voltage drop across $R_{TS}$ and the voltage drop across $R_{PAR}$, i.e., $V_{TS} = V_{RTS} = V_{RPAR}$. As depicted in FIG. 2, $R_{PAR}$ may be the electrical equivalent of a series resistance along the negative rail of the battery back 204. Thus, as charging current $I_{CH}$ changes, the voltage drop across $R_{PAR}$ will also change, thus influencing $V_{TS}$. In this embodiment, compensation circuitry 212 is coupled to the $V_{TS}$ node (211) and configured to generate a current proportional to the voltage drop across $R_{PAR}$. In other words, compensation circuitry 212 operates to sink current from the node 211 to reduce or eliminate the effects of $R_{PAR}$ on $V_{TS}$.

In this embodiment, compensation circuitry 212 may include an amplifier 214, an N-type transistor 216 and a resistor $R_B$ (218). As depicted in FIG. 2, the amplifier 214 has a positive input terminal that is coupled across the sense resistor $R_{SEN}$ (via the negative voltage rail 203), a negative terminal coupled to a source of the transistor 216 and an output coupled to a gate of the transistor 216. The transistor 216 has a drain coupled to the $V_{TS}$ node 211 and the source coupled to the amplifier 214 and resistor $R_B$ 218. Resistor $R_B$ 218 is also coupled to the negative voltage rail 203, on the opposite side of $R_{SEN}$ from positive terminal of the amplifier 214. Operation of the compensation circuitry 212 is described in greater detail below.

As a general matter, the amplifier 214 may have a relatively large DC gain, and the feedback arrangement of the amplifier 214 depicted in FIG. 2 attempts to keep the positive and negative input terminals of the amplifier 214 substantially equal. The voltage drop, $V_{RSEN}$, across $R_{SEN}$ (where $V_{RSEN} = I_{CH} * R_{SEN}$) drives the positive input terminal of the amplifier 214. Therefore, the negative input of the amplifier 214 attempts to match the positive input of the amplifier 214 so that the output of the amplifier 214 remains approximately fixed. The output of amplifier 214 controls the conduction state of transistor 216, which, in turn, controls the magnitude of the compensation current $I_{COMP}$ drawn from node 211. In one exemplary embodiment, transistor 216 may be a small signal NMOSFET device that generally operates in a linear region across the range of output voltages from amplifier 214. Thus, the voltage-current characteristics of transistor 216 may vary depending on the gate voltage provided by the amplifier 214. Since the sense resistor $R_{SEN}$ and the parasitic resistance $R_{PAR}$ are in series along the negative voltage rail, the charging current $I_{CH}$ may produce proportional voltage drops across $R_{PAR}$ and $R_{SEN}$. Thus, the generated compensation current $I_{COMP}$ may be proportional to the charging current $I_{CH}$ through the sense resistor $R_{SEN}$, and may therefore be given by:

$$I_{COMP} = I_{CH} * R_{SEN} / R_B \quad (1)$$

Thus, as the charging current $I_{CH}$ changes, the compensation current $I_{COMP}$ will also change. This compensation current is drawn from the $V_{TS}$ node 211 and acts as a current sink proportional to the current across the parasitic resistance $R_{PAR}$. The compensated $V_{TS}$ voltage can be derived as:

$$\frac{V_{REF} - V_{TS}}{R_{PU}} = I_{COMP} + \frac{V_{TS} - I_{CH} * R_{PAR}}{R_{TS}} \quad (2)$$

Rearranging equation (2) yields:

$$\frac{V_{REF} - V_{TS}}{R_{PU}} = \frac{V_{TS}}{R_{TS}} + I_{CH}\left(\frac{R_{SEN}}{R_B} - \frac{R_{PAR}}{R_{TS}}\right) \quad (3)$$

The second item on the right side of equation (3) is derived from the charging current induced error across the parasitic resistance $R_{PAR}$. When the charging current $I_{CH}$ is zero, equation (3) may be viewed as ideal for temperature sensing of the battery pack 204, since the effects of parasitic resistance $R_{PAR}$ are eliminated. Thus, in the present embodiment, $R_B$ may be selected so that the parasitic resistance is compensated, i.e., reduced or eliminated, from equation (3). The target resistance value for $R_B$ may be selected based on an OT threshold value ($T_0$) of the thermistor $R_{TS}$ and the value of $R_{PAR}$, and may be given by:

$$R_B = R_{SEN} * R_{TS}(T_0) / R_{PAR} \quad (4)$$

For a given charger/battery pack pair, the value of $R_{PAR}$ will typically remain fixed. Thus, the value of $R_{PAR}$ may be determined upon initialization or manufacture of the battery pack/charger system. The OT threshold value ($T_0$) may be supplied by, for example, the battery pack manufacturer and this may used, for given $V_{REF}$ and $R_{PU}$ values, to determine the resistance of $R_{TS}$ at the threshold value (i.e., $R_{TS}(T_0)$). Once the values of $R_{PAR}$ and $R_{TS}(T_0)$ are known, the value of $R_B$ may be set for the compensation circuit 212. Alternatively or additionally, charger controller 208 may be configured to measure $R_{PAR}$ dynamically to permit, for example, a different battery pack to be coupled to charger 202, and $R_B$ may include a programmable resistor that having a resistance value controlled by the charger 208.

In operation, for a given value of charging current $I_{CH}$, the amplifier 214 will cause the transistor 216 to conduct at a level that forces the positive and negative terminals of the amplifier to be substantially equal. Thus, for a given level of charging current $I_{CH}$, the voltage drop across the parasitic resistance $R_{PAR}$ will be fixed and therefore a proportional compensation current may be drawn from the $V_{TS}$ node 211 by the compensation circuitry 212 to remove, in whole or in part, the voltage drop effects of the parasitic resistance. Thus, the voltage at the $V_{TS}$ node 211 will largely reflect the voltage drop across the thermistor $R_{TS}$, which is directly proportional to the temperature of the battery pack 204. As the charging current increases, the voltage drop across the parasitic resistance $R_{PAR}$ will increase, and the positive terminal of the amplifier 214 will increase above the negative terminal of the amplifier 214 (due to an increased voltage drop across $R_{SEN}$). This may cause the output of the amplifier 214 to increase, which in turn causes transistor 216 to increase conductivity (by reducing the effective resistance of the transistor 216), thus drawing more current from the $V_{TS}$ node 211 until the voltage drop across $R_B$ is proportional to the voltage drop across $R_{SEN}$ (in other words, the negative terminal of the amplifier 214 is increased until it substantially equals the positive terminal of the amplifier 214). Similarly, as the charging current decreases, the voltage drop across the parasitic resistance $R_{PAR}$ will decrease, and the positive terminal of the amplifier 214 will decrease (due to an decreased voltage drop across $R_{SEN}$). This may cause the output of the amplifier 214 to increase below the negative terminal of the amplifier 214, which in turn causes transistor 216 to decrease conductivity (by increasing the effective resistance of the transistor 216), thus drawing less current from the $V_{TS}$ node 211 until the voltage drop across $R_B$ is proportional to the voltage drop across $R_{SEN}$ (in other words, the negative terminal of the amplifier 214 is decreased until it substantially equals the positive terminal of the amplifier 214).

As noted above, the parasitic resistance artificially increases the voltage at the $V_{TS}$ node, i.e., $V_{TS}=V_{RTS}+V_{RPAR}$. For a given temperature of the battery pack 204, as the charging current $I_{CH}$ changes, the compensation current $I_{COMP}$ will proportionally change, and the current across $R_{TS}$ ($I_{RTS}$) will inversely proportionally change. Thus, as the charging current increases, the voltage drop across the parasitic resistance $R_{PAR}$ will increase, the compensation current will increase proportionally, thus decreasing the current through the thermistor ($I_{RTS}$) in an amount proportional to the voltage drop across $R_{PAR}$ so that the voltage at the voltage node $V_{TS}$ is largely controlled by the voltage drop across the thermistor $R_{TS}$, i.e., $V_{TS}=V_{RTS}$. Similarly, as the charging current decreases, the compensation current decreases and $I_{RTS}$ increases, with little or no change in $V_{TS}$.

As the temperature in the battery pack changes, the resistance of $R_{TS}$ will change and thus $I_{RTS}$ will change, thus causing a change in voltage of the $V_{TS}$ node. Thus, assuming that $R_{TS}$ is an NTC type thermistor, as the temperature of the battery pack 204 increases (as a result of, for example, an increase in charging current), the resistance of $R_{TS}$ will decrease and the voltage at the $V_{TS}$ node will increase, thus enabling the charger controller 208 to detect the increase in temperature of the battery pack 204, while the error caused by the parasitic resistance $R_{PAR}$ is reduced or eliminated. Similarly, and still assuming that $R_{TS}$ is an NTC type thermistor, as the temperature of the battery pack 204 decreases (as a result of, for example, a decrease in charging current), the resistance of $R_{TS}$ will increase and the voltage at the $V_{TS}$ node will decrease, thus enabling the charger controller 208 to detect the decrease in temperature of the battery pack 204, while the error caused by the parasitic resistance $R_{PAR}$ is reduced or eliminated.

If the temperature of the thermister $R_{TS}$ is at the over-temperature (OT) threshold temperature $T_0$, then the compensation circuitry 212 is configured to eliminate, or substantially eliminate, the error introduced by the parasitic resistance $R_{PAR}$. Considering equations (3) and (4) above, if the temperature is below or above $T_0$ (and $R_{TS}$ is an NTC type thermistor), then the voltage at $V_{TS}$ may include an error due to the parasitic resistance. For example, if the temperature of the battery pack 204 is less than $T_0$, e.g., $T_0-\Delta T$, corresponding to a resistance of the thermistor of $R_{TS}(T_0)+\Delta R_{TS}$, then the error in $V_{TS}$ due to the parasitic resistance $R_{PAR}$ is $I_{CH}*R_{PAR}*(-\Delta R_{TS}/R_{TS}(T_0))*R_{PU}/(R_{PU}+R_{TS}(T_0))$. This error is derived from equations (3) and (4) above with $R_B=R_{SEN}*R_{TS}(T_0)/R_{PAR}$ and $R_{TS}=R_{TS}(T_0)+\Delta R_{TS}$ substituted in the second item on the right side of equation (4). At temperatures much less than $T_0$, this error may result in a lower $V_{TS}$ than the expected one, corresponding to a detected temperature that is higher than the actual temperature of the battery pack 204. As the temperature approaches $T_0$, this error may approach zero. Advantageously, the compensation circuit 212 is configured to eliminate or approximately eliminate the error due to the parasitic resistance $R_{PAR}$ at the over-temperature threshold $T_0$ and to reduce error due to the parasitic resistance $R_{PAR}$ at temperatures other than $T_0$.

Figure 3:
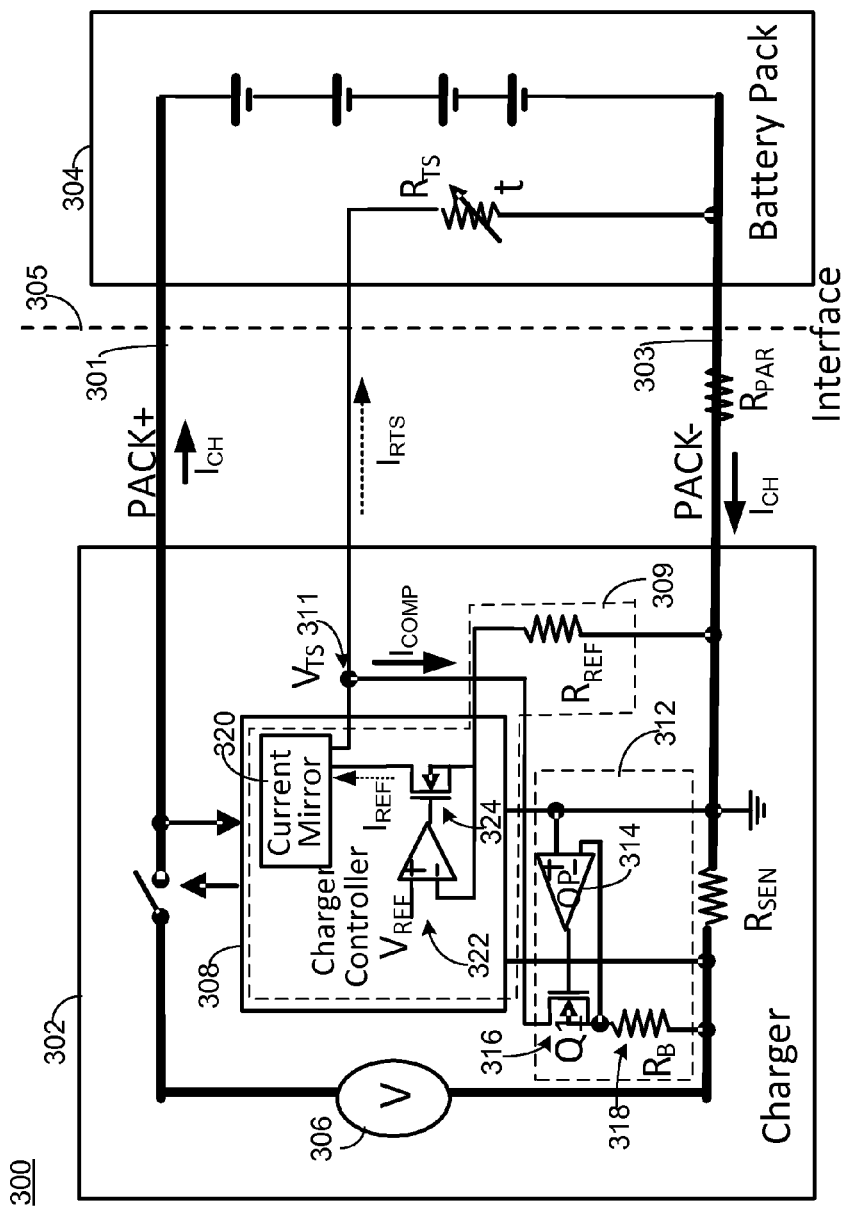
FIG. 3 depicts a block diagram of another exemplary power topology with battery temperature detection and parasitic resistance compensation capabilities, consistent with the present disclosure.

FIG. 3 depicts an exemplary battery charging system 300 consistent with another embodiment of the present disclosure. The charging system 300 is similar to the charging system 200 of the previous embodiment, except that this embodiment uses a charger controller current source to power the thermistor $R_{TS}$ and also, in this embodiment, multiple instances of a reference current may be used for multiple battery packs, and the pull-up resistor ($R_{PU}$) may be eliminated. This embodiment may include a charger 302 and a battery pack 304 where the charger 302 is configured to deliver charging current to the battery 304 via voltage rails 301 (PACK +) and 303 (PACK −). The charger 302 and battery pack 304 may be operably coupled together at interface 305, which may include, for example, PCB traces, wire traces or direct contact. As in the previous embodiment, battery pack 304 may include one or more battery cells, typically connected in series and configured to receive a charge and to supply power to a load. The battery pack 304 may also include a thermistor $R_{TS}$ operably coupled to the charger 302 to enable the charger 302 to obtain a battery temperature measurement. Thermistor $R_{TS}$ may be configured to change resistance as the temperature of the battery pack 304 changes.

The charger 302 may include a source voltage 306 configured to supply a charging current to the battery, and, in some embodiments, may also be configured to supply power to a load (not shown in this Figure). The charger 302 may also include a charger controller 308 operably coupled to the source voltage 306 and the battery pack 304 and configured to control the charging current, $I_{CH}$, to the battery pack 304. In this embodiment, charger controller 308 may include current mirror circuitry 320, amplifier circuitry 322, a transistor 324 and reference resistor, $R_{REF}$ (the operation of which are described in greater detail below). Examples of charger controllers which may be utilized according to the teachings of the present embodiment may include the OZ8980 and/or the OZ8981 manufactured by O2Micro International, Ltd. However, those skilled in the art will recognize that other charger controllers may be used according to the teachings herein, such as any charger controller that includes control circuitry as described herein and that is configured to control charging current to batteries based on charging current and battery temperature feedback information. The charger 302 may include a sense resistor $R_{SEN}$ which operates as a feedback resistor, and controller 308 may be configured to sense the voltage drop across $R_{SEN}$ to detect the battery charging current $I_{CH}$ supplied to the battery pack 304.

The charger controller 308 may include a voltage sensing input $V_{TS}$ which receives voltage information at node 311. The current source circuitry 309 may include current mirror 320, amplifier 322, transistor 324 and reference resistor $R_{REF}$. As depicted in FIG. 3, the amplifier 322 has a positive input terminal coupled to a reference voltage $V_{REF}$, a negative terminal coupled to a source of transistor 324 and an output coupled to the gate of transistor 324. The transistor 324 has a drain coupled to the current mirror 320 and the source coupled to the amplifier 322 and resistor $R_{REF}$. Resistor $R_{REF}$ is also coupled to the negative voltage rail 303 on the opposite side of $R_{REF}$ from the source of transistor 324.

Similar to amplifier 214, amplifier 322 may have a relatively large DC gain, and the feedback arrangement of amplifier 322 depicted in FIG. 3 attempts to keep the positive and negative input terminals of the amplifier 322 substantially equal. As a result, amplifier 322, transistor 324 and reference resistor $R_{REF}$ are configured to provide reference current $I_{REF}$ (proportional to $V_{REF}$) to current mirror 320. In particular, for the circuit depicted in FIG. 3, $I_{REF}=V_{REF}/R_{REF}$.

As a general matter, a current mirror may be considered as a current amplifier. A current mirror may be configured to provide at least one output current proportional to an input current. For example, the current mirror may receive an input reference current and may be configured provide one or more output reference currents where each output current is equal to the input current. Each output reference current may supply current to one of a plurality of thermistors in a plurality of battery packs. In this example, the plurality of output currents may be provided using relatively fewer pull-up resistors (as compared to the topology of, e.g., FIG. 2).

The current source circuitry 309 depicted in FIG. 3 is configured to provide an output current ($I_{REF}$) to node 311. In a configuration without compensation circuitry 312 and without parasitic resistance $R_{PAR}$, $I_{REF}$ would then be supplied to thermistor $R_{TS}$ coupled to node 311. Sensing a voltage across $R_{TS}$ would then provide a measure of the resistance of thermistor $R_{TS}$ and therefore temperature of battery pack 304, as described above.

The charger 302 may also include a voltage sensing input $V_{TS}$ which receives voltage information at node 311. The temperature feedback functionality provided by thermistor $R_{TS}$ and sensed voltage $V_{TS}$ is similar to that described above. Further, compensation circuitry 312 (configured to compensate for parasitic resistance $R_{PAR}$) is similar to the compensation circuitry 212 described above. Node 311 is configured to receive reference current $I_{REF}$ from current mirror 320, compensation circuitry 312 is configured to sink the generated compensation current $I_{COMP}$ from node 311 and thermistor $R_{TS}$ is configured to draw a thermistor current $I_{RTS}$ from node 311. Accordingly, $I_{REF} = I_{COMP} + I_{RTS}$, for the topology depicted in FIG. 3. $I_{COMP}$ is given by equation (1) above and $I_{RTS}$ may be derived from $V_{TS} = I_{RTS} * R_{TS} + I_{CH} * R_{PAR}$. The compensated temperature sensing voltage $V_{TS}$ may therefore be derived as:

$$V_{TS} = \frac{V_{REF}}{R_{RRF}} R_{TS} + I_{CH}\left(R_{PAR} - \frac{R_{SEN} R_{TS}}{R_R}\right) \quad (5)$$

Similar to equation (3) above, the second item on the right side of equation (5) is derived from the charging current induced error across the parasitic resistance $R_{PAR}$. When the charging current is zero, equation (5) may be viewed as ideal for temperature sensing of the battery pack 304, since the effects of parasitic resistance $R_{PAR}$ are eliminated. Thus, similar to the embodiment depicted in FIG. 2, in the present embodiment, $R_B$ may be selected so that the parasitic resistance is compensated, i.e., reduced or eliminated from equation (5). The target resistance value for $R_B$ may be selected based on an OT threshold value ($T_0$) of the thermistor $R_{TS}$ and the value of $R_{PAR}$, and may be given by equation (4) above.

In operation, compensation circuitry 312 is configured to generate the compensation current $I_{COMP}$ based, at least in part, on the charging current $I_{CH}$, as described above. The compensation circuitry 312 is configured to adjust the generated compensation current $I_{COMP}$ in response to a change in the charging current $I_{CH}$, as described above. As the charging current changes and the voltage drop across the parasitic resistance $R_{PAR}$ changes correspondingly, the compensation circuitry 312 is configured to adjust the compensation current proportionally to compensate for the effect of the voltage drop across $R_{PAR}$ on $V_{TS}$.

As the temperature of the battery pack 304 changes, the resistance of the thermistor $R_{TS}$ will change, thus causing a change in the voltage of the $V_{TS}$ node 311. Unlike the embodiment depicted in FIG. 2, in the embodiment depicted in FIG. 3, because the current supplied to the thermistor $R_{TS}$ is from a current source (current mirror 320), the current supplied to the thermistor $R_{TS}$ will not change when the resistance of $R_{TS}$ changes. Rather, the voltage across the thermistor $V_{RTS}$ will change in proportion to the resistance change. Thus, assuming that $R_{TS}$ is an NTC type thermistor, as the temperature of the battery pack 304 increases, the resistance of $R_{TS}$ will decrease and the voltage at the $V_{TS}$ node 311 will decrease, thus enabling the charger controller 308 to detect the increase in temperature of the battery pack 304.

If the temperature is at the over-temperature (OT) threshold temperature $T_0$, then the compensation circuitry 312 is configured to eliminate, or substantially eliminate, the error introduced by the parasitic resistance $R_{PAR}$. Considering equations (4) and (5) above, if the temperature is below $T_0$ (and $R_{TS}$ is an NTC type thermistor), then the voltage at $V_{TS}$ may include an error due to the parasitic resistance. For example, if the temperature of the battery pack 304 is less than $T_0$, e.g., $T_0 - \Delta T$, corresponding to a resistance of the thermistor of $R_{TS}(T_0) + \Delta R_{TS}$, then the error in $V_{TS}$ due to the parasitic resistance $R_{PAR}$ is $I_{CH} * R_{PAR} * (-\Delta R_{TS}/R_{TS}(T_0))$. This error is derived from equations (4) and (5) above with $R_B = R_{SEN} * R_{TS}(T_0)/R_{PAR}$ and $R_{TS} = R_{TS}(T_0) + \Delta R_{TS}$ substituted in the second item on the right side of equation (5). At temperatures much less than $T_0$, this error may result in a lower $V_{TS}$ than expected one, corresponding to a detected temperature that is higher than the actual temperature of the battery pack 304. As the temperature approaches $T_0$, this error may approach zero. Advantageously, the compensation circuit 312 is configured to eliminate or approximately eliminate the error due to the parasitic resistance $R_{PAR}$ at the over-temperature threshold $T_0$ and to reduce error due to the parasitic resistance $R_{PAR}$ at temperatures other than $T_0$.

Figure 4:
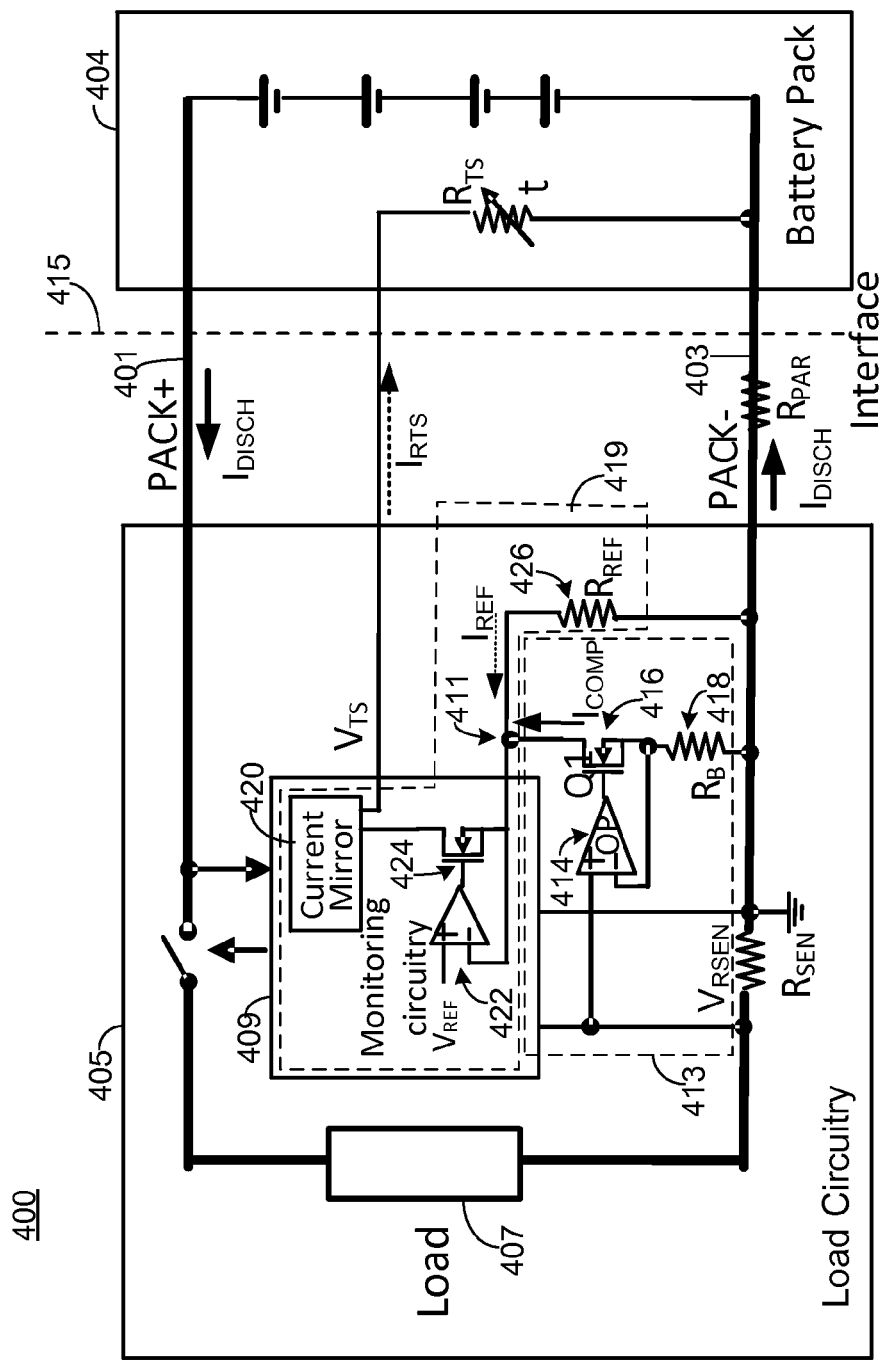
FIG. 4 depicts a block diagram of another exemplary power topology with battery temperature detection and parasitic resistance compensation capabilities, consistent with the present disclosure.

FIG. 4 depicts an exemplary battery discharging system 400 consistent with another embodiment of the present disclosure. The discharging system 400 is similar to the charging system 300 of the previous embodiment, except that in this embodiment the battery pack is powering a load and compensation current is based on discharge current rather than charging current. This embodiment may include a load circuitry 405 and a battery pack 404 where the battery pack 404 is configured to deliver discharging current to the load circuitry 405 via voltage rails 401 (PACK+) and 403 (PACK−). The load circuitry 405 and battery pack 404 may be operably coupled at interface 415, which may include, for example, PCB traces, wire traces or direct contact. As in the previous embodiments, battery pack 404 may include one or more battery cells, typically connected in series and configured to receive a charge and to supply power to a load, e.g., load circuitry 405. The battery pack 404 may also include a thermistor $R_{TS}$ operably coupled to the load circuitry 405 to enable the load circuitry 405 to obtain a battery temperature measurement. Thermistor $R_{TS}$ may be configured to change resistance as the temperature of the battery pack 404 changes.

The load circuitry 405 may include a load 407 configured to receive a discharging current from the battery. The load circuitry 405 may also include monitoring circuitry 409 operably coupled to the load 407 and the battery pack 404 and configured to control the discharging current, $I_{DISCH}$, from the battery pack 404. In this embodiment, load circuitry 405 may include current mirror circuitry 420, amplifier circuitry 422, transistor 424 and resistor, $R_{REF}$ (the operation of which are described in greater detail below). Examples of monitoring circuitry which may be utilized according to the teachings of the present embodiment may include OZ8980 and/or the OZ8981 manufactured by O2Micro International, Ltd. However, those skilled in the art will recognize that other monitoring circuitry may be used according to the teachings herein, such as any monitoring circuitry that includes control circuitry as described herein and that is configured to control discharging current from batteries based on discharging current and battery temperature feedback information. The load circuitry 405 may include a sense resistor $R_{SEN}$ which operates as a feedback resistor, and monitoring circuitry 409 may be configured to sense the voltage drop across $R_{SEN}$ to detect the battery discharging current $I_{DISCH}$ drawn from the battery pack 404.

Monitoring circuitry 409 may include a voltage sensing input $V_{TS}$ which receives voltage information from temperature sensing circuitry 410. The current source circuitry 419 may include current mirror 420, amplifier 422, transistor 424 and reference resistor $R_{REF}$. As depicted in FIG. 4, the amplifier 422 has a positive input terminal coupled to a reference voltage $V_{REF}$, a negative terminal coupled to a source of transistor 424 and an output coupled to the gate of transistor 424. The transistor 424 has a drain coupled to the current mirror 420 and the source coupled to the amplifier 422 and resistor $R_{REF}$ (at node 411). Resistor $R_{REF}$ is also coupled to the negative voltage rail 403 on the opposite side of $R_{REF}$ from the source of transistor 424 (and node 311). In a configuration without compensation circuitry 413 and without parasitic resistance $R_{PAR}$, $I_{RTS}$ would be equal to $V_{REF}/R_{REF}$ (by operation of amplifier 422 as described herein), and sensing a voltage across $R_{TS}$ would provide a measure of the resistance of thermistor $R_{TS}$ and therefore temperature of battery pack 404.

Load circuitry 405 may also include compensation circuitry 413 configured to compensate for parasitic resistance $R_{PAR}$. The compensation circuitry 413 may be coupled to the current source circuitry 419 at node 411. In this embodiment, compensation circuitry may include amplifier 414, transistor 416 and resistor $R_B$. As depicted in FIG. 4, amplifier 414 has a positive input terminal coupled to sense resistor $R_{SEN}$, a negative input terminal coupled to source of transistor 416 and an output coupled to the gate of transistor 416. The transistor 416 has a drain coupled to node 411 (and the source of transistor 424) and the source coupled to the negative input terminal of amplifier 414 and resistor $R_B$. Resistor $R_B$ is also coupled to the negative voltage rail 403 on the opposite said of $R_B$ from the source of transistor 414.

In the embodiment depicted in FIG. 4, the compensation circuitry 413 is configured to inject compensation current $I_{COMP}$ into the current source circuitry 419 so that the output current $I_{RTS}$ from the current mirror 420 will include both the reference current $I_{REF}$ and the compensation current $I_{COMP}$. Similar to amplifiers 214 and 322, amplifiers 414 and 422 may have a relatively large DC gain, and the feedback arrangements of the amplifiers 414 and 422 depicted in FIG. 4 attempt to keep the positive and negative input terminals of each amplifier 414, 422, substantially equal. Considering compensation circuitry 413, the voltage drop $V_{RSEN}$ across $R_{SEN}$ (where $V_{RSEN}=I_{DISCH}*R_{SEN}$) drives the positive terminal of amplifier 414. By operation of the amplifier 414 and transistor 416, the compensation current $I_{COMP}$ is equal to $V_{RSEN}/R_B$ and thus, $I_{COMP}=I_{DISCH}*R_{SEN}/R_B$. Considering current source circuitry 419, reference voltage $V_{REF}$ drives the positive terminal of amplifier 422. By operation of the amplifier 422 and transistor 424, node 411 is at the reference voltage $V_{REF}$. Thus, the current, $I_{REF}$, through $R_{REF}$ is $V_{REF}/R_{REF}$. The currents $I_{REF}$ and $I_{COMP}$ sum at node 411 and the output current of node 411 is supplied to the current mirror 420. The current mirror 420 may then provide a compensated output current $I_{RTS}$ to the thermistor $R_{TS}$. Thus, the output current $I_{RTS}$ of the embodiment depicted in FIG. 4 is (assuming unity gain in the current mirror 420):

$$I_{RTS} = \frac{V_{REF}}{R_{RFF}} + I_{DISCH}\frac{R_{SEN}}{R_R} \qquad (6)$$

The monitoring circuitry 409 may also include a voltage sensing input $V_{TS}$ which receives voltage information from thermistor $R_{TS}$. The temperature feedback functionality provided by thermistor $R_{TS}$ and sensed voltage $V_{TS}$ is similar to that described above. Thus, the voltage information from thermistor $R_{TS}$ may include the voltage drop across the thermistor (i.e., $I_{RTS}*R_{TS}$) and the voltage drop across the parasitic resistance $R_{PAR}$ (which is a function of the discharge current $I_{DISCH}$) may be given as:

$$V_{TS}=I_{RTS}*R_{TS}-I_{DISCH}*R_{PAR}$$

By substituting equation (6) into equation (7), $V_{TS}$ may be derived as:

$$V_{TS} = \frac{V_{REF}}{R_{REF}}R_{TS} + I_{DISCH}\left(\frac{R_{SEN}R_{TS}}{R_B} - R_{PAR}\right) \qquad (8)$$

The second item on the right side of equation (8) is derived from the discharging current induced error across the parasitic resistance $R_{PAR}$. When the discharging current is zero, equation (8) may be viewed as ideal for temperature sensing of the battery pack 404, since the effects of parasitic resistance $R_{PAR}$ are eliminated. Thus, similar to the embodiments depicted in FIGS. 2 and 3, in the present embodiment, $R_B$ may be selected so that the parasitic resistance is compensated, i.e., reduced or eliminated from equation (8). The target resistance value for $R_B$ may be selected based on an OT threshold value ($T_O$) of the thermistor $R_{TS}$ and the value of $R_{PAR}$, and may be given by equation (4) above.

In operation, compensation circuitry 413 is configured to generate the compensation current $I_{COMP}$ based, at least in part, on the discharging current $I_{DISCH}$, as described above. The compensation circuitry 413 is configured to adjust the generated compensation current $I_{COMP}$ in response to a change in the discharging current $I_{DISCH}$. As the discharging current changes and the voltage drop across the parasitic resistance $R_{PAR}$ changes correspondingly, the compensation circuitry 413 is configured to adjust the compensation current proportionally to compensate for the effect of the voltage drop across $R_{PAR}$ on $V_{TS}$.

As the temperature of the battery pack 404 changes, the resistance of the thermistor $R_{TS}$ will change, thus causing a change in the voltage $V_{TS}$. Similar to the embodiment depicted in FIG. 3, in the embodiment depicted in FIG. 4, because the current supplied to the thermistor $R_{TS}$ is from a current source (current mirror 420), the current supplied to the thermistor $R_{TS}$ will not change when the resistance of $R_{TS}$ changes. Rather, the voltage across the thermistor $V_{RTS}$ will change in proportion to the resistance change. Thus, assuming that $R_{TS}$ is an NTC type thermistor, as the temperature of the battery pack 404 increases, the resistance of $R_{TS}$ will decrease and the sensed voltage $V_{TS}$ will decrease, thus enabling the monitoring circuitry 409 to detect the increase in temperature of the battery pack 404.

If the temperature of the thermister $R_{TS}$ is at the over-temperature (OT) threshold temperature $T_O$, then the compensation circuitry 413 is configured to eliminate, or substantially eliminate, the error introduced by the parasitic resistance $R_{PAR}$. Considering equations (7) and (8) above, if the temperature is below or above $T_O$ (and $R_{TS}$ is an NTC type thermistor), then the voltage at $V_{TS}$ may include an error due to the parasitic resistance. For example, if the temperature of the battery pack 404 is less than $T_O$, e.g., $T_O-\Delta T$, corresponding to a resistance of the thermistor of $R_{TS}(T_O)+\Delta R_{TS}$, then the error in $V_{TS}$ due to the parasitic resistance $R_{PAR}$ is $I_{DISCH}*R_{PAR}*(\Delta R_{TS}/R_{TS}(T_0))$. This error is derived from equations (7) and (8) above with $R_B=R_{SEN}*R_{TS}(T_0)/R_{PAR}$ and $R_{TS}=R_{TS}(T_0)+\Delta R_{TS}$ substituted in to equation (8). At temperatures much less than $T_0$, this error may result in a higher $V_{TS}$ than expected one, corresponding to a detected temperature that is lower than the actual temperature of the battery pack 404. As the temperature approaches $T_0$, this error may approach zero. Advantageously, the compensation circuit 413 is configured to eliminate or approximately eliminate the error due to the parasitic resistance $R_{PAR}$ at the over-temperature threshold $T_0$ and to reduce error due to the parasitic resistance $R_{PAR}$ at temperatures other than $T_0$.

Systems configured to provide battery temperature detection and parasitic resistance compensation for charging and/or discharging a battery have been described. Compensation circuitry is provided to generate a compensation current, proportional to a battery charging or discharging current, to compensate for the parasitic resistance associated with the line connection between a charger/monitor and a battery pack. The compensation current operates to adjust a reference current supplied to a temperature sensor, to enable accurate temperature measurement of the battery pack without influence from the parasitic resistance. The compensation circuitry can be utilized in a battery charger topology to enhance battery charging control and/or a battery monitoring topology to enhance battery discharge control.

"Circuitry", as used in any embodiment herein, may comprise, for example, singly or in any combination, hardwired circuitry, programmable circuitry, state machine circuitry, and/or firmware that stores instructions executed by programmable circuitry.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents.

What is claimed is:

1. A battery charger system, comprising:
    charger controller circuitry configured to generate a controllable charging current to charge a battery coupled to the charger controller, the charger controller comprising a temperature sensing node configured to be coupled to temperature sensor circuitry, associated with the battery, to monitor a voltage drop proportional to the temperature of the battery, wherein when the battery charger circuitry is coupled to the battery, a parasitic resistance is generated; and
    compensation circuitry coupled to the temperature sensing node and configured to generate a compensation current that sinks current from the temperature sensing node in an amount proportional to a voltage drop of the controllable charging current across the parasitic resistance,
    wherein the charger controller circuitry further comprises current source circuitry configured to supply a temperature sensing current, based on a reference current, to the temperature sensor circuitry, and
    wherein the current source circuitry comprises:
        amplifier circuitry having a first input configured to receive a reference voltage and a second input coupled to a reference resistor;
        a first transistor configured to be controlled by an output of the amplifier circuitry; and
        a current mirror, wherein the first transistor is coupled between the current mirror and the reference resistor to generate the reference current, and
        wherein the output of the amplifier circuitry controls the resistance of the first transistor so that the voltage at the first input substantially matches the voltage at the second input.

2. The battery charger system of claim 1, wherein the temperature sensor circuitry comprises a thermistor coupled adjacent to the battery and configured to change resistance in response to a change in temperature of the battery.

3. The battery charger system of claim 1, wherein the value of the temperature sensing current is determined by the reference current and the compensation current.

4. The battery charger system of claim 1, further comprising a sense resistor configured to generate a voltage drop proportional to the controllable charging current,
    wherein the compensation circuitry comprises an amplifier, a second transistor and a resistor component,
    wherein the amplifier has a first input coupled to a first side of the sense resistor and a second input coupled to an output of the second transistor, and the amplifier has an output coupled to the second transistor to control the conduction state of the second transistor,
    wherein the second transistor and the resistor component are coupled in series between the temperature sensing node and a second side of the sense resistor, and
    wherein the output of the amplifier controls the resistance of the second transistor so that the voltage at the first input of the amplifier substantially matches the voltage at the second input of the amplifier.

5. A battery discharging system, comprising:
    monitoring circuitry configured to control a discharge current from a battery, the monitoring circuitry comprising;
        a temperature sensing node configured to be coupled to temperature sensor circuitry, associated with the battery, to monitor a voltage drop proportional to the temperature of the battery; and
        current source circuitry configured to supply a temperature sensing current, based on a reference current, to the temperature sensor circuitry, wherein when the monitoring circuitry is coupled to the battery, a parasitic resistance is generated; and
    compensation circuitry coupled to the current source monitoring circuitry and configured to generate a compensation current that sources current into the current source monitoring circuitry in an amount proportional to a voltage drop of the discharge current across the parasitic resistance,
    wherein the current source circuitry comprises:
        amplifier circuitry having a first input configured to receive a reference voltage and a second input coupled to a reference resistor;
        a first transistor configured to be controlled by an output of the amplifier circuitry; and
        a current minor, wherein the first transistor is coupled between the current minor and the reference resistor to generate the reference current, and
        wherein the output of the amplifier circuitry controls the resistance of the first transistor so that the voltage at the first input substantially matches the voltage at the second input.

6. The battery discharging system of claim 5, wherein the temperature sensor circuitry comprises a thermistor coupled adjacent to the battery and configured to change resistance in response to a change in temperature of the battery.

7. The battery discharging system of claim 5, wherein the value of the temperature sensing current is determined by the reference current and the compensation current.

8. The battery discharging system of claim 5, further comprising a sense resistor configured to generate a voltage drop proportional to the discharge current,
wherein the compensation circuitry comprises an amplifier, a second transistor and a resistor component,
wherein the amplifier has a first input coupled to a first side of the sense resistor and a second input coupled to an output of the second transistor, and the amplifier has an output coupled to the second transistor to control the conduction state of the second transistor,
wherein the second transistor and the resistor component are coupled in series between the current source monitoring circuitry and a second side of the sense resistor, and
wherein the output of the amplifier controls the resistance of the second transistor so that the voltage at the first input of the amplifier substantially matches the voltage at the second input of the amplifier.

9. A battery charger system, comprising:
charger controller circuitry configured to generate a controllable charging current to charge a battery coupled to the charger controller, the charger controller comprising a temperature sensing node configured to be coupled to temperature sensor circuitry, associated with the battery, to monitor a voltage drop proportional to the temperature of the battery, wherein when the battery charger circuitry is coupled to the battery, a parasitic resistance is generated;
a sense resistor configured to generate a voltage drop proportional to the controllable charging current; and
compensation circuitry comprising an amplifier, a first transistor and a resistor component, wherein the amplifier includes:
a first input coupled to a first side of the sense resistor and a second input coupled to an output of the first transistor; and
an output coupled to the first transistor to control the conduction state of the first transistor,
wherein the first transistor and the resistor component are coupled in series between the temperature sensing node and a second side of the sense resistor, and
wherein the output of the amplifier controls the resistance of the first transistor so that the voltage at the first input substantially matches the voltage at the second input.

10. The battery charger system of claim 9, wherein the temperature sensor circuitry comprises a thermistor coupled adjacent to the battery and configured to change resistance in response to a change in temperature of the battery.

11. The battery charger system of claim 9, further comprising temperature sensing circuitry coupled to the temperature sensing node and configured to supply a temperature sensing current to the temperature sensor circuitry.

12. The battery charger system of claim 11, wherein the charger controller circuitry is further configured to generate a reference voltage,
wherein the temperature sensing circuitry comprises a resistor coupled between the reference voltage and the temperature sensing node to generate a reference current, and
wherein the value of the reference current is determined by the temperature sensing current and the compensation current.

13. The battery charger system of claim 9, wherein the charger controller circuitry further comprises current source circuitry configured to supply a temperature sensing current, based on a reference current, to the temperature sensor circuitry.

14. The battery charger system of claim 13, wherein the current source circuitry comprises:
amplifier circuitry having a first input configured to receive a reference voltage and a second input coupled to a reference resistor;
a second transistor configured to be controlled by an output of the amplifier circuitry; and
a current mirror, wherein the second transistor is coupled between the current mirror and the reference resistor to generate the reference current, and
wherein the output of the amplifier circuitry controls the resistance of the second transistor so that the voltage at the first input of the amplifier circuitry substantially matches the voltage at the second input of the amplifier circuitry.

15. A battery discharging system, comprising:
monitoring circuitry configured to control a discharge current from a battery, the monitoring circuitry comprising a temperature sensing node configured to be coupled to temperature sensor circuitry, associated with the battery, to monitor a voltage drop proportional to the temperature of the battery, wherein when the monitoring circuitry is coupled to the battery, a parasitic resistance is generated;
a sense resistor configured to generate a voltage drop proportional to the discharge current; and
compensation circuitry comprising an amplifier, a first transistor and a resistor component,
wherein the amplifier has:
a first input coupled to a first side of the sense resistor, a second input coupled to an output of the first transistor; and
an output coupled to the first transistor to control the conduction state of the first transistor,
wherein the first transistor and the resistor component are coupled in series between the current source monitoring circuitry and a second side of the sense resistor, and
wherein the output of the amplifier controls the resistance of the first transistor so that the voltage at the first input substantially matches the voltage at the second input.

16. The battery discharging system of claim 15, wherein the temperature sensor circuitry comprises a thermistor coupled adjacent to the battery and configured to change resistance in response to a change in temperature of the battery.

17. The battery discharging system of claim 15, wherein the monitoring circuitry further comprises current source circuitry configured to supply a temperature sensing current, based on a reference current, to the temperature sensor circuitry.

18. The battery discharging system of claim 17, wherein the current source circuitry comprises:
amplifier circuitry having a first input configured to receive a reference voltage and a second input coupled to a reference resistor;
a second transistor configured to be controlled by an output of the amplifier circuitry; and
a current mirror, wherein the second transistor is coupled between the current mirror and the reference resistor to generate the reference current, and wherein the output of the amplifier circuitry controls the resistance of the second transistor so that the voltage at the first input of the amplifier circuitry substantially matches the voltage at the second input of the amplifier circuitry.

\* \* \* \* \*